Feb. 2, 1965  A. E. VERNEY III  3,168,070
INTER-AUTOMOBILE DEFECT WARNING SIGN
Filed Jan. 30, 1964

Inventor—
ALICK E. VERNEY III
Dudley B. Howard
Attorney—

3,168,070
INTER-AUTOMOBILE DEFECT WARNING SIGN
Alick E. Verney III, 81 N. Mitchell Ave.,
Livingston, N.J.
Filed Jan. 30, 1964, Ser. No. 341,341
2 Claims. (Cl. 116—28)

This invention relates in general to signaling devices for motor vehicles, and has particular reference to a device of this kind for installation in a motor vehicle to permit the driver thereof to visually warn the driver of an adjacent vehicle concerning operational failure of a safety appliance carried by the latter.

By way of explanation, it is well known that one of the most common causes of rear-end collisions in the operation of motor vehicles is the tendency of many drivers to follow too closely behind the vehicle just ahead. The hazard attending this bad practice is aggravated by the prevailing high speeds at which motor vehicles are driven, especially on the thru-ways and in bad weather. Because of this hazard, motorists are frequently warned in newspaper and magazine articles to observe certain safe intervals behind preceding vehicles at various speeds and specified weather conditions. However, the most careful regulation of the distance at which one driver trails another may not avert a rear-end collision if the brake stop lights of the car ahead are not functioning.

It, therefore, is the primary object of my present invention to provide signaling means by which the driver of a motor vehicle equipped therewith may quickly and intelligibly warn the driver of a preceding vehicle that, when he slows his speed by foot pressure on the brake pedal, his red tail lamps are not lighting up, possibly because of broken light bulbs or defective electrical circuits.

I am aware of prior art signaling means to warn the driver of a following motor vehicle that: he is coming too close for safety; that the signaling car is stopped for some reason, such as to repair a flat tire; or that help is needed, as when the driver is being threatened by a dangerous hitchiker. However, I have no knowledge of any device adapted for use in warning the driver of a preceding vehicle as to the faulty operational condition of his brake lights or any other equipment.

Another object is to provide a signal device to indicate the failure of the brake lights of a preceding vehicle that is extremely simple in construction, that is readily operable, and that may be manufactured at very low cost.

Figure 1:
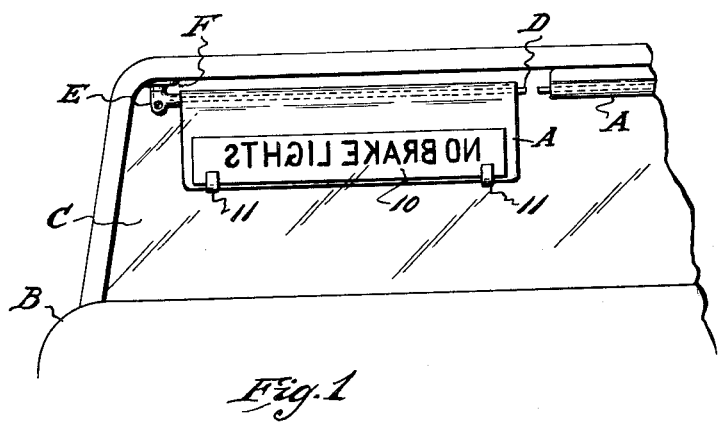
Figures 2, 3:
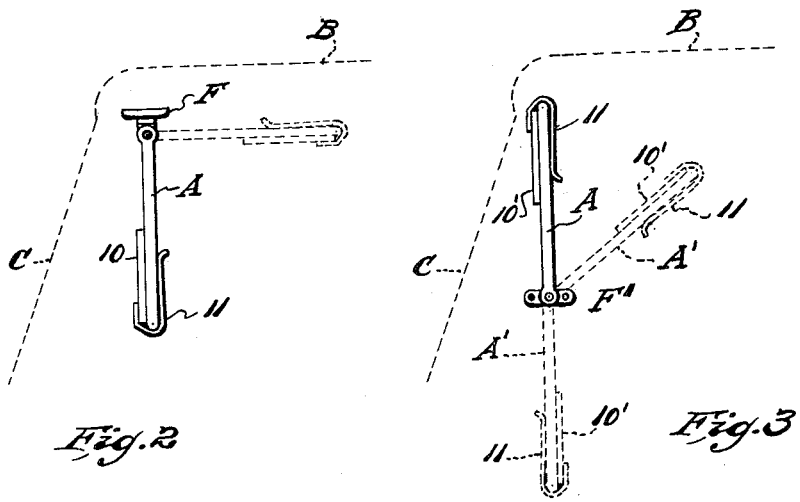

Further objects, advantages and features of the invention will become apparent as the following specific description is read in connection with the accompanying drawings, in which:

FIG. 1 is a fragmentary front elevational view of the front end of an automobile body showing the warning sign of my invention applied to one of the conventional sun visors which has been adjusted into operative display position by turning it downward from horizontal inoperative position;

FIG. 2 is a side elevational view of the sun visor and warning sign alone, on an enlarged scale, showing the sign in the same position as in FIG. 1; and FIG. 3 is a view similar to FIG. 2, showing a modification wherein the sun visor is mounted lower than in the conventional installation, the visor being turned up into vertical operative position for sign display in full lines, turned down into vertical position for use as a sun shield in broken lines, and turned midway into horizontal inoperative position also in broken lines.

Referring now in detail to the drawings, wherein like reference characters designate corresponding parts in the several views, FIG. 1 shows a warning sign 10 applied to one of the sun visors A of conventional construction as it appears to an observer standing directly in front of the signaling motor vehicle B and looking toward its windshield C. The sun visor A which is in front of the driver's seat is shown in inoperative position, wherein it is arranged in a horizontal plane. The sun visor that is located in front of the passenger's seat has been chosen for attachment of the warning sign 10 because, when it is turned down into normal sun shielding position to permit forwardly presented display of the sign, the vision of the driver will not be obscured.

In the embodiment of the sun visor represented in FIGS. 1 and 2, the conventional construction includes a substantially horizontal rod D which is embedded in one longitudinal edge of visor A. The base end of rod D is hinged by a friction joint E to a bracket F attached by screws or equivalent means to car body B at one side of windshield C in such a manner that said rod may be swung to a slight degree upwardly and downwardly and rotated on its longitudinal axis. However, in the conventional sun visor construction and arrangement, bracket F is located so near the top of windshield C that the visor A cannot be rotated to a sufficient degree to permit elevation of the latter into an upturned position in which sign 10 will be visible through windshield C when affixed to the rear face of said visor. Consequently, in use of the conventional sun visor, it becomes necessary to apply sign 10 to the front face of visor A for forwardly presented display through windshield C, as shown in FIG. 1, when the visor A is downturned into the operative position represented in FIG. 2. An objectionable feature of this arrangement is the fact that sign 10 will be displayed whenever visor A is turned down to shield the passenger's eyes from the sun when driving toward it.

Regardless of which embodiment of sun visor construction is chosen as a mount for my warning sign, it is necessary to have the word, or words, required spelled backwards as shown in FIG. 1 in order that the message may be understood by the driver of the preceding car when the sign is reflected rearwardly toward his eyes in reverse order by his rear view mirror.

To render the sign visible at night, the lettering may be made with luminous paint.

Although the sign 10 depicted in FIG. 1 is intended to signal the driver of a preceding car that his brake lights are not working, due to broken light bulbs, a broken electric circuit, or other cause, it is to be understood that various operational defects may be indicated by quick substitution of appropriate signs, such as one to warn of an incipient flat tire condition.

FIG. 3 shows a modified form of sun visor A' that makes it possible to apply the warning sign 10' to the reverse face thereof in such a maner that it will not be displayed forwardly to view by the driver of a preceding car when it is desired to rotate the visor into a vertically depending sun shielding position. This is achieved by lowering attaching bracket F' to a different position at the side of body B. The construction is such, however, that the same visor may be inverted by rotation through an arc of 180 degrees to make the sign forwardly presented whenever the occasion arises to warn a preceding car's driver of a serious operational defect, such as the failure of his brake lights, or a flat tire.

At least one spring clip tongue 11 is provided on sign 10 or 10', as the case may be, for clamping engagement with sun visor A or A'. In either embodiment, clip tongue 11 is caused to embrace the distal edge of the sun visor.

While the invention has been illustrated and described with respect to two embodiments thereof, it will be understood that it is intended to cover all changes and modifications of the embodiments shown which do not constitute departures from the spirit of the invention and scope of the appended claims.

I claim:

1. A signalling device for use in a first vehicle having a transparent windshield at its front end, said signalling device comprising:

a fixed support arranged adjacent to said windshield;

a flat opaque sun visor rotatably mounted on said fixed support for adjustment between an operative position in which the plane thereof is vertically arranged and an inoperative position which is at an angle of between 90 and 180 degrees with respect to said operative position;

said sun visor having a forward surface which faces the windshield when the sun visor is in its operative position;

means for signalling the driver of a second vehicle which precedes said first vehicle comprising a sign attached to the forward surface of said sun visor, said sign bearing on its face indicia which forms the mirror image of at least one word, whereby the indicia is observable as forming at least one coherent word when it is reflected by the rear view mirror of the second vehicle.

2. In a first vehicle having a transparent windshield at one end thereof and a rotatably mounted sun visor having a flat forward surface which faces said windshield when it is rotated to an operative position, a device for signalling the driver of a second vehicle which precedes said first vehicle comprising:

a sign;

means for affixing said sign to the forward surface of said sun visor;

said sign bearing indicia which constitute the mirror image of at least one word, whereby the indicia are recognizable by the driver of the second vehicle when observed through a rear view mirror as at least one coherent word.

References Cited by the Examiner

UNITED STATES PATENTS

| | | | |
|---|---|---|---|
| 1,371,678 | 3/21 | Gerken | 40—129 |
| 1,468,672 | 9/23 | Patten | 40—129 |
| 1,979,727 | 11/34 | Bennett et al. | 88—75 |
| 2,970,864 | 2/61 | McCann | 296—97.11 |
| 3,007,435 | 11/61 | Peterson | 116—28 |
| 3,141,253 | 7/64 | Bartram | 116—28 |

FOREIGN PATENTS 309,381    11/55    Switzerland.

References Cited by the Applicant

UNITED STATES PATENTS

| | | |
|---|---|---|
| 2,182,275 | 12/39 | Blonkvist. |
| 2,671,423 | 3/54 | Mead. |
| 2,891,140 | 6/59 | Huff. |
| 2,939,108 | 5/60 | McIntire. |

LOUIS J. CAPOZI, *Primary Examiner.*

LEO SMILOW, *Examiner.*